Inventor
Walter B. Putnam,

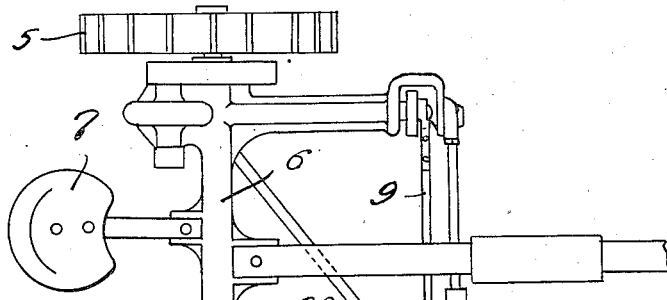
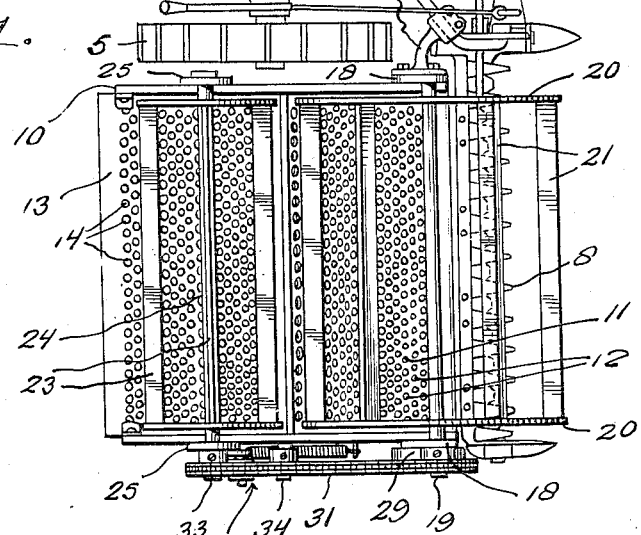
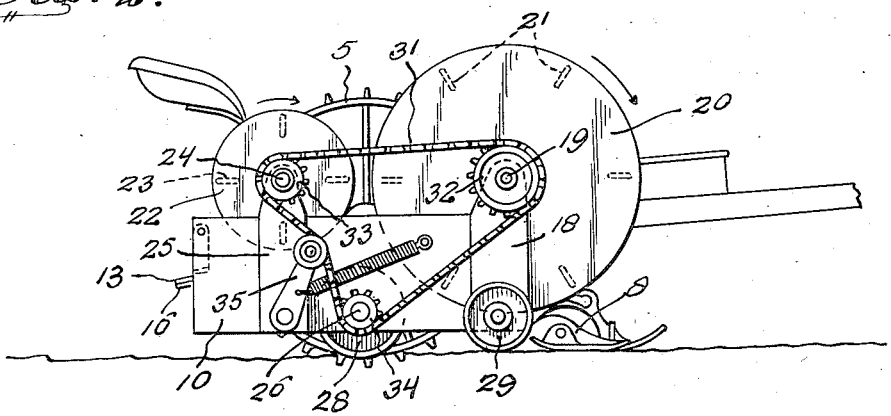

Patented May 12, 1936

2,040,498

UNITED STATES PATENT OFFICE 2,040,498

SEED GATHERING DEVICE

Walter B. Putnam, Cherryville, N. C.

Application November 27, 1934, Serial No. 755,052

6 Claims. (Cl. 56—207)

This invention relates to a seed gathering device particularly designed as an attachment for a harvesting machine of the mower or reaper type in which the standing stalks of grain are cut by the operation of a reciprocating sickle or cutter bar.

More particularly, the present invention aims to provide an efficient means or device for gathering the seeds from the standing grains that are shed during the cutting operation of the harvesting machine.

The present invention is particularly useful in gathering the seeds of the Japanese clover or Lespedeza which often sheds considerable seed during the cutting or mowing operation.

An important object of the present invention is to provide a seed gathering device of the above kind embodying simple and efficient means to assist in detaching the seeds from the plants as they are cut or mowed, means for effectively collecting the detached seeds and for delivering the stover onto the ground at the rear of the device as the cutting or mowing operation proceeds.

A further object of the present invention is to provide a seed gathering device of the above kind which is extremely simple and durable in construction, capable of ready attachment to existing mowing machines, and highly efficient in operation.

The present invention consists in the novel form, combination and arrangement of parts hereinafter more fully described, shown in the accompanying drawings, and claims.

In the drawings:

Figure 1 is a top plan view of a mowing machine equipped with a seed gathering device constructed in accordance with the present invention.

Figure 2 is a side elevational view thereof.

Figure 3:
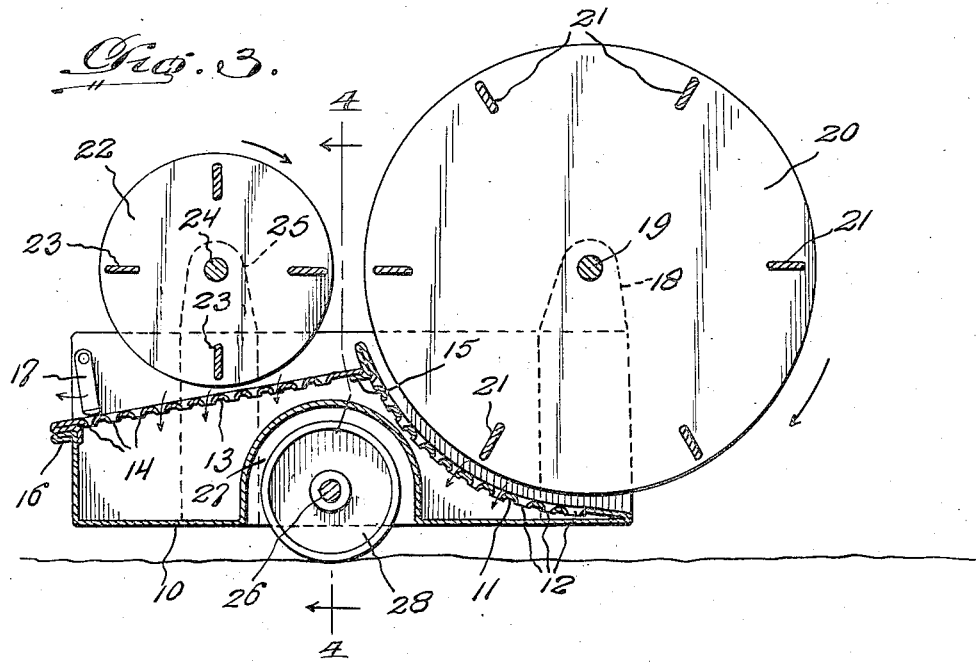
Figure 3 is an enlarged central longitudinal sectional view of the seed gathering device per se.

Referring more in detail to the drawings, an embodiment of the present invention is shown operatively associated with a conventional mowing machine having coaxial traction wheels 5 supporting a main frame 6 which carries the usual seat 7 for the driver or operator of the mowing machine. Extending laterally to one side of the main frame 6 is the usual cutting mechanism of the mowing machine generally indicated at 8 and including the ordinary reciprocable cutter bar operated by a pitman 9 operatively geared to one of the traction wheels 5. As this mowing machine is of a generally well known and conventional type, forming no specific part of the present invention, further detailed description thereof will be unnecessary.

The present seed gathering device is adapted to be attached to the mowing machine so as to travel therewith and to occupy a position directly at the rear of the cutting mechanism 8 of the mowing machine. In the illustrated embodiment of the present invention, there is provided a seed collecting pan 10, the forward portion of which is covered at the top by a concave screen 11 preferably formed of sheet metal and provided with perforations 12 through which the seeds shed during and detached immediately subsequent to the cutting operation may pass into the collecting pan 10. This screen 11 extends rearwardly and upwardly from the forward edge of the bottom of pan 10 and from a point level with the cutting mechanism 8 of the mowing machine.

The present device further includes a flat rearwardly inclined rear screen 13 covering the top of the collecting pan 10 at the rear of the latter and also preferably constructed of sheet metal and provided with openings 14 through which the detached seeds may pass into the collecting pan 10. The rear screen 13 preferably rests at its forward edge upon a rearward flange 15 on the rear edge of the forward screen 11 and also upon a flange 16 provided on the upper edge of the rear wall of seed collecting pan 10, being suitably removably held in place by means such as pivoted fasteners 17. Obviously, by releasing the fasteners 17, the rear screen section 13 may be removed to facilitate access to the seed gathered in the pan 10 for removal of the same from said pan 10.

Rigid with and rising from opposite sides of the seed collecting pan 10 at the front of the latter are suitable brackets 18 in the upper ends of which are journaled the opposite ends of a transverse horizontal shaft 19 which carries a rotary beating reel consisting of disks 20 fixed on the shaft 19 at the inner sides of brackets 18 and rigidly connected near their peripheries by transverse beater bars 21. The beater reel thus provided is of certain diameter that its periphery operates in close proximity to the forward screen 11, with which the latter is concentrically arranged. Accordingly, as the standing plants are cut by the mechanism 8, this reel catches the falling plants and forces them rearwardly over the upper surface of the forward screen 11 so that the seed shed by the plants immediately subsequent to the cutting operation are caught by the screen 11 and passed through the openings 12 of the latter into the seed collecting pan 10 along with such additional seed as are detached from the plant by the beating operation of this reel.

The present invention further includes a second smaller beating reel consisting of disks 22 rigidly connected near their peripheries with transverse beating bars 23 and secured on a further horizontal transverse shaft 24 journaled in further brackets 25 rigid with and rising from opposite sides of the seed collecting pan near the rear of the latter. This rear beating reel operates in close proximity to the upper surface of the rear screen 13, and receives the plants from the forward beating reel, pressing said plants against the rear screen 13 and causing detachment of additional seeds which fall through the openings 14 of the rear screen 13 into the rear portion of seed collecting pan 10. In addition, the rear beating reel delivers the stover onto the ground at the rear of the seed gathering device as it travels along with the mower during the cutting operation.

Suitable means is provided for driving the beating reels of the device upon forward movement of the latter with the mowing machine. In the embodiment of the invention illustrated, the driving means for the beating reels consists of a transverse drive shaft 26 extending through the intermediate portion of the seed collecting pan 10 and suitably journaled in the side walls of the latter as well as in the side walls of an upwardly projecting pocket 27 provided in the bottom wall of pan 10 intermediate the sides of the latter, said pocket 27 providing clearance for a ground engaging or traction wheel 28 secured on the intermediate portion of drive shaft 26 as clearly shown in Figures 3 and 4. The traction wheel 28 supports the seed collecting pan 10 a slight distance above the ground in connection with a further supporting wheel 29 suitably journaled at the outer side of pan 10 near the front of the latter. The seed collecting pan is properly supported above the ground at the inner side by suitable means such as a rigid bracket 30 by means of which the seed gathering device is rigidly connected to the mowing machine and caused to travel along with the latter. Upon forward travel of the device, it will be apparent that traction wheel 28 will be caused to turn so as to drive shaft 26, and motion from shaft 26 is transmitted to the shafts 19 and 24 of the beating reels by means of suitable gearing such as an endless sprocket chain 31 passing around sprockets 32, 33 and 34 respectively secured on the ends of shafts 19, 24 and 26 at the outer side of the device. Any suitable form of chain tightener may be provided as generally indicated at 35 to take up any slack which may exist in the chain 31 and insure maintenance of said sprocket chain in operative engagement with the sprocket wheel. The sprocket wheel 33 on the shaft 24 of the rear beating reel is preferably of smaller diameter than sprocket wheel 32 on shaft 19 of the front beating reel, so that the rear beating reel will be driven at a greater speed than said front beating reel. The purpose of this arrangement is to cause the rear beating reel to forcibly draw the plants as they are delivered rearwardly by the front beating reel and positively eject the stover from the device onto the ground at the rear of said device during the seed gathering operation. Also, the highest speed of the smaller rear beating reel will cause more violent beating of the plants for causing efficient detachment of seed from the plants which would ordinarily not be shed during the mowing or cutting operation or during the interval when the plants are acted upon by the slower moving forward beating reel.

It will be noted that the front screen section 11 is concentric to and corresponds to the peripheral curvature of the front beating reel so as to coact with the latter and afford a very efficient initial threshing operation. The rearwardly inclined position of the rear screen 13 enhances the action of the rear beating reel in rearwardly discharging the stover onto the ground at the rear of the seed gathering device.

Figure 4:
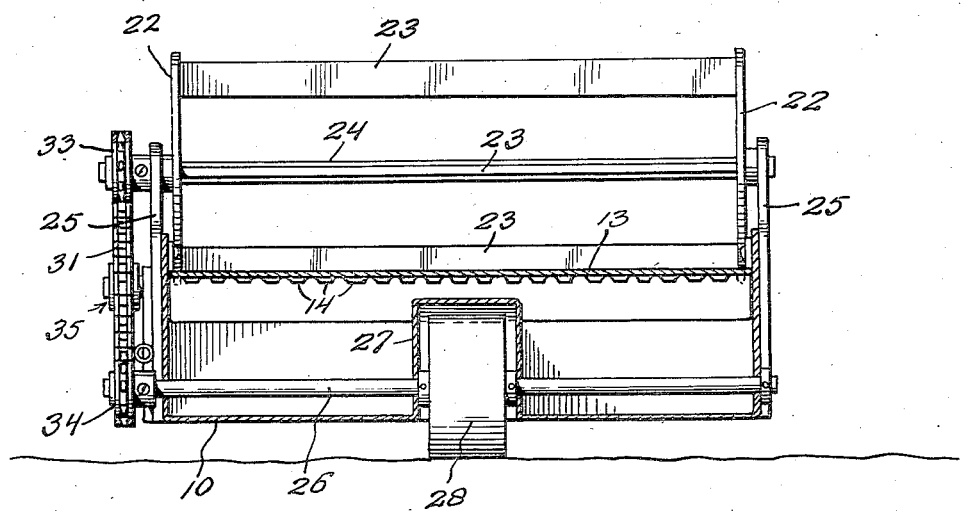
Figure 4 is a transverse section on line 4—4 of Figure 3.

In operation, the device is drawn forwardly by the mowing machine and the beating reels are rotated in the direction of the arrows shown in Figure 3 by reason of motion transmitted to such beating reels through the gearing described from traction wheel 28 and its shaft 26. As the plants or grain are cut or severed by the cutter bar of the mowing machine, the forward reel presses them backward upon the forward screen 11 and at the same time beats the plants or grain as they are carried upwardly and rearwardly over forward screen 11. The seed which is shed during the cutting operation and released by the beating action of the front beating reel falls onto the screen 11 and passes through the openings 12 of the latter into the seed collecting pan 10. The plants or grain are then fed rearwardly where they are taken by the rear beating reel and pressed downwardly and rearwardly upon the rear screen 13, said rear beating reel acting upon the plants or grain to cause further detachment of seed and finally discharging the stover beyond the rear of the seed collecting pan and onto the ground. Such additional seed as are detached by the rear beating reel fall onto the rear screen 13 and ultimately pass through the openings 14 of the latter into the rear portion of seed collecting pan 10.

It is to be understood that the invention is susceptible of considerable modification, and numerous ways and means for driving the beating reels will suggest themselves to those skilled in the art. Accordingly, the present invention is to be construed as embracing all such modifications as may fairly fall within the scope of the invention as claimed.

What I claim as new is:

1. A seed gathering attachment for mowing machines comprising a seed collecting pan, a concave screen covering the top of said pan at its forward portion and arranged to receive the cut grain and permit the seed shed therefrom to pass therethrough into said pan, a rotary beating reel carried by said pan and arranged above said concave screen for beating the cut grain backward over the surface of said concave screen, a further rearwardly inclined screen covering the top of the seed collecting pan at its rear portion, a second smaller beating reel carried by the pan and arranged above the last-named screen for receiving the cut grain from the first-named reel and beating the same rearwardly across the surface of the second-named screen and then discharging the stover onto the ground at the rear of the seed collecting pan, said second-named screen being removable from the seed collecting pan and the first named screen and having openings to permit seed to pass therethrough into the seed collecting pan as it is detached by the second-named reel, and means for driving said reels upon forward travel of the device with the mowing machine.

2. A seed gathering attachment for mowing machines comprising a seed collecting pan, a concave screen covering the top of said pan at its forward portion and arranged to receive the cut grain and permit the seed shed therefrom to pass therethrough into said pan, a rotary beating reel carried by said pan and arranged above said concave screen for beating the cut grain backward over the surface of said concave screen, a further rearwardly inclined screen covering the top of the seed collecting pan at its rear portion, a second smaller beating reel carried by the pan and arranged above the last-named screen for receiving the cut grain from the first-named reel and beating the same rearwardly across the surface of the second-named screen and then discharging the stover onto the ground at the rear of the seed collecting pan, said second-named screen having openings to permit seed to pass therethrough into the seed collecting pan as it is detached by the second-named reel, means for driving said reels upon forward travel of the device with the mowing machine, said second-named screen being further removable from the seed collecting pan and the first-named screen, and means releasably securing said second-named screen in place.

3. A seed gathering attachment for mowing machines comprising a seed collecting pan, a concave screen covering the top of said pan at its forward portion and arranged to receive the cut grain and permit the seed shed therefrom to pass therethrough into said pan, a rotary beating reel carried by said pan and arranged above said concave screen for beating the cut grain backward over the surface of said concave screen, a further screen covering the top of the seed collecting pan at its rear portion, a second smaller beating reel carried by the pan and arranged above the last-named screen for receiving the cut grain from the first-named reel and beating the same rearwardly across the surface of the second-named screen and then discharging the stover onto the ground at the rear of the seed collecting pan, said second-named screen having openings to permit seed to pass therethrough into the seed collecting pan as it is detached by the second-named reel, and means for driving said reels upon forward travel of the device with the mowing machine, said reel driving means providing for driving the second-named reel at a higher speed than the first-named reel for drawing the plants or grain from the first-named reel and forcibly discharging the stover onto the ground pursuant to a final relatively rapid beating operation thereof upon the plants or grain over the surface of the second-named screen.

4. A seed gathering attachment for mowers comprising a seed collecting pan provided with supporting wheels, a forward concave screen covering the top of said pan at its forward portion, a second screen removable from the seed collecting pan and the first-named screen and covering the top of said pan at its rear portion, horizontal beating reels journaled above the respective screens, said forward screen being of concave form and concentric with as well as in close proximity to the periphery of the beating reel disposed thereabove, and means for driving said beating reels so as to rotate the reel above the second-named screen faster than the reel above the first named screen.

5. A seed gathering attachment for mowing machines comprising a seed collecting pan, a concave screen covering the forward portion of said pan and extending in a rearward and upward direction, a second rearwardly inclined screen covering the rear portion of said pan and removable from the seed collecting pan and the first-named screen, beating reels disposed above the respective screens, the concave forward screen being concentric with and in close proximity to the periphery of the beating reel disposed thereabove, and means for driving said beating reels.

6. A seed gathering attachment for mowing machines comprising a seed collecting pan, a concave screen covering the forward portion of said pan and extending in a rearward and upward direction, a second removable screen covering the rear portion of said pan and located at a rearward and downward inclination, beating reels disposed above the respective screens, the concave forward screen being concentric with and in close proximity to the periphery of the beating reel disposed thereabove, the beating reel disposed above the rear screen being of relatively small diameter, and means for driving said reels upon forward travel of the attachment with the mowing machine, whereby the rear smaller reel is driven at a higher rate of speed than the forward reel.

WALTER B. PUTNAM.